US012656234B2

(12) United States Patent
Goyal et al.

(10) Patent No.: US 12,656,234 B2
(45) Date of Patent: Jun. 16, 2026

(54) EVALUATING STRUCTURAL CAPABILITY OF MATERIALS UNDER AXISYMMETRIC THERMOMECHANICAL LOADING

(71) Applicant: The Aerospace Corporation, El Segundo, CA (US)

(72) Inventors: Vinay K. Goyal, El Segundo, CA (US); Jacob Rome, Hawthorne, CA (US)

(73) Assignee: The Aerospace Corporation, El Segundo, CA (US)

( * ) Notice: Subject to any disclaimer, the term of this patent is extended or adjusted under 35 U.S.C. 154(b) by 462 days.

(21) Appl. No.: 18/334,492

(22) Filed: Jun. 14, 2023

(65) Prior Publication Data

US 2024/0418615 A1 Dec. 19, 2024

(51) Int. Cl.
G01N 3/18 (2006.01)
(52) U.S. Cl.
CPC ....... G01N 3/18 (2013.01); G01N 2203/0037 (2013.01); G01N 2203/0057 (2013.01)
(58) Field of Classification Search
CPC .... G01M 5/0033; G01M 15/00; G01M 15/02; G01M 13/00; G01M 7/022; G01M 15/14; G01M 7/027; G01M 7/02; G01N 3/32; G01N 17/006; G01N 3/12; G01N 3/56; G01N 25/20; G01N 3/04; G01N 3/20; G01N 1/04; G01N 3/38; G01N 19/04; G01N 3/02; G01N 3/18; G01N 3/24; G01N 3/08; G01N 3/10; G01N 25/72; G01N 17/00; G01N 19/02; G01N 3/06; G01N 33/388; B25B 11/00; B23K 13/015; B23K 31/12; B64C 1/10; E21B 33/062; C22C 1/00; C22C 38/02; G01L 5/24; F01D 21/003; G06F 30/23; G06F 30/20; B32B 37/0023; Y02E 30/30; B21J 1/06; H02K 7/09; F16B 31/06; E04H 12/08; C21D 9/50; B01L 1/00; B64D 45/00; A01K 93/00; B64F 5/10
See application file for complete search history.

(56) References Cited

U.S. PATENT DOCUMENTS 10,752,386 B1 8/2020 Fan et al.
2005/0145036 A1* 7/2005 Keener ................. G01N 19/04
73/761

OTHER PUBLICATIONS

Lander, et al., "Laser-Hardened Materials Evaluation Laboratory Testing Facility", Proceedings of SPIE, https://ui.adsabs.harvard.edu/link_gateway/1992SPIE.1624 . . . 99L/doi:10.1117/12.60100.
Zhao, et al., "Aerothermal Testing of Ablatives for Material Performance", AIAA SciTech 2020 Forum, Jan. 6-10, 2020, Orlando, FL.

* cited by examiner

*Primary Examiner* — Brandi N Hopkins
(74) *Attorney, Agent, or Firm* — LeonardPatel PC; Sheetal S. Patel; Michael A. Leonard, II

(57) ABSTRACT

Evaluating structural capability of materials under axisymmetric thermomechanical loading includes placing a test material between an upper fixture and a lower fixture. A plurality of bolts arranged around the upper fixture and the lower fixture. The plurality of bolts are configured to apply a preload around the circumference of the upper fixture and the lower fixture. The upper fixture and the lower fixture includes an opening facilitating a heat load to be applied to the test material.

20 Claims, 4 Drawing Sheets

EVALUATING STRUCTURAL CAPABILITY OF MATERIALS UNDER AXISYMMETRIC THERMOMECHANICAL LOADING

FIELD

The present invention relates to evaluating laser harden materials, and more particularly, to evaluating structural capability of materials under axisymmetric thermomechanical loading.

BACKGROUND

Space vehicles during testing have failed. More specifically, during flight, structural degradation of the skin has occurred during high speed reentry (e.g., Mach greater than 5) into the atmosphere. Analysis has shown that under certain conditions, the structure is unable to withstand the stresses during re-entry. This is caused by the thermomechanical loads caused by the heating environments, the constraints caused by the design of the vehicle, and the aerodynamic loads.

There is a need for ground tests that can replicate environments, which are difficult to analyze. Existing test designs are unable to replicate flight-like stresses while subjecting the test article to high-temperature conditions present during flight.

Thus, a test configured to replicate the same failure mode as seen in flight with flight-like temperatures is needed.

SUMMARY

Certain embodiments of the present invention may provide solutions to the problems and needs in the art that have not yet been fully identified, appreciated, or solved by current structural testing technologies. For example, some embodiments of the present invention pertain to evaluating structural capability of materials under axisymmetric thermomechanical loading.

In one embodiment, an apparatus configured to evaluate structural capability of materials under axisymmetric thermomechanical loading includes a test material placed between an upper fixture and a lower fixture, and a plurality of bolts arranged around the upper fixture and the lower fixture. The plurality of bolts are configured to apply a preload around the circumference of the upper fixture and the lower fixture, and the upper fixture and the lower fixture comprises an opening facilitating a heat load to be applied to the test material.

In another embodiment, a method for evaluating structural capability of materials under axisymmetric thermomechanical loading includes placing a test material between an upper fixture and a lower fixture, and applying a mechanical load around a circumference of the upper fixture and the lower fixture creating an equiaxial state of stress at center of the test material. The applying of the preload comprises tightening a plurality of bolts around the circumference of the upper fixture and the lower fixture. The method also includes applying a heating load in an axisymmetric manner at center of the test material, causing equiaxial stresses.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 is a graph illustrating fiber failure index as a function of time, according to an embodiment of the present invention.

DETAILED DESCRIPTION OF THE EMBODIMENTS

Figure 1:
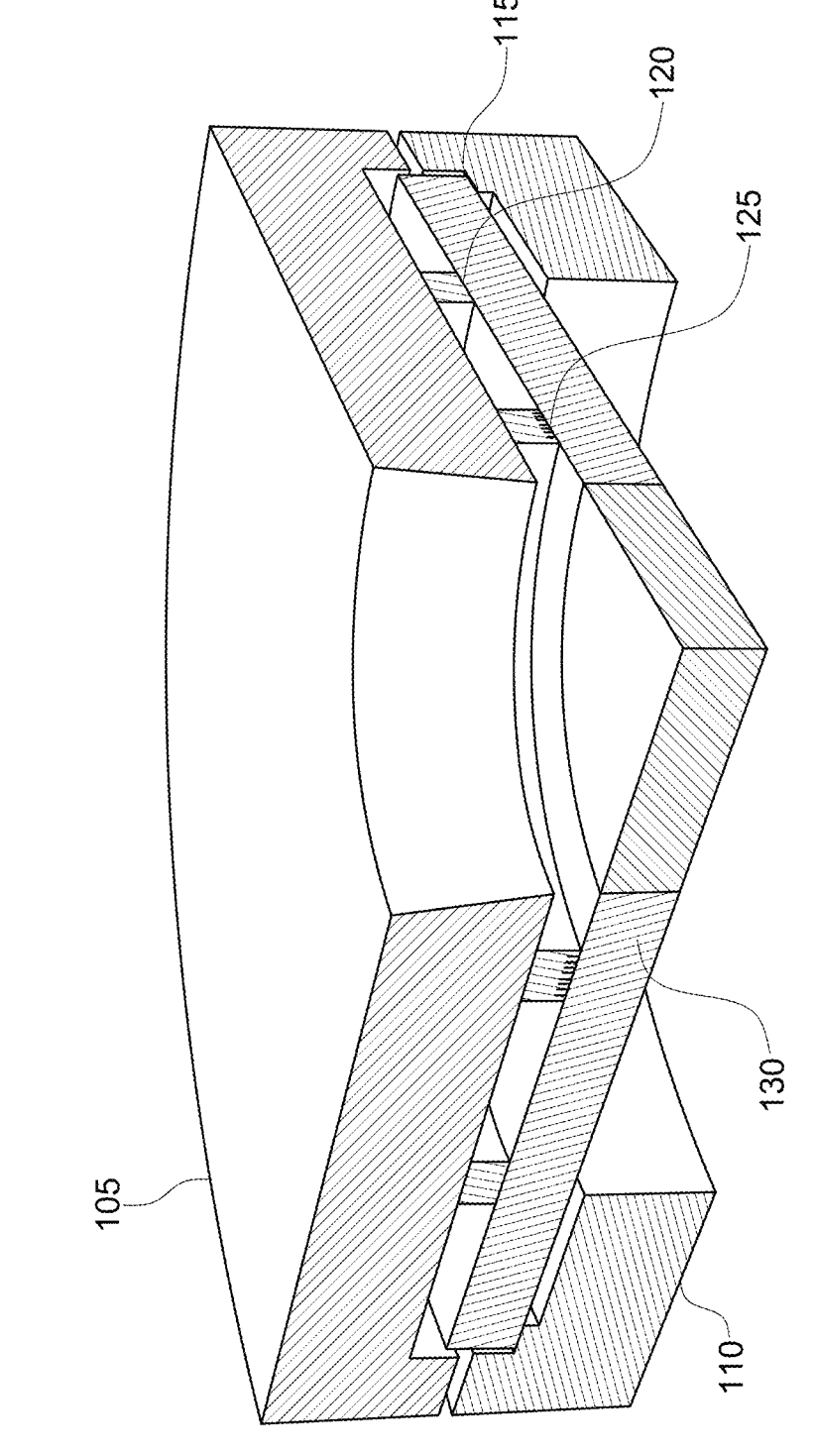
FIG. 1 is a diagram illustrating quarter of a test fixture, according to an embodiment of the present invention.

Some embodiments generally pertain to evaluating structural capability of materials under axisymmetric thermomechanical loading. For example, some embodiments includes a test fixture that introduces mechanical and heating loads at the same time, while simulating re-entry environments experienced by the structure. See, for example, FIG. 1, which is a diagram illustrating quarter of a test fixture 100 (e.g., the test fixture is axisymmetric), according to an embodiment of the present invention. Test fixture 100 includes an upper fixture 105 and a lower fixture 110, both of which are made of a metallic material. A preload is applied around the circumference of upper fixture 105 and lower fixture 110 by tightening bolts that are spread out evenly (bolts are not illustrated). Lower fixture 110 is an annulus with an inner radius that is a fraction in length of the outer radius.

Near the outer radius of upper fixture 105 and lower fixture 110, there is a small shelf designated as outer pad 115. This is where sample 130 is placed. The top half of upper fixture 105, there is another annulus, with an outer radius equaling to that of the bottom half of fixture 110.

The top half of upper fixture 105 has an inner radius with a small fraction in length of the outer radius. At intermediate radii, there are additional pads (middle pad 120 and inner pad 125) that extend downward from the top half of upper fixture 105. In this embodiment, the smaller radius pad is designated as an inner pad 125 and the other pad is designated as middle pad 120. Pads 120 and 125 sit flat on the sample (or component) 130 and apply a mechanical load on sample 130 by way of tightening the bolts on the outer boundary of upper fixture 105.

Around the circumference (e.g., outer edge) of upper fixture 105, bolts are used to create preload in sample 130 and are used to connect the two halves of upper fixture 105 and lower fixture 110. This effectively imposes axisymmetric axial loads on sample 130 at the location of outer pad 115, middle pad 120, and inner pad 125. This creates an equiaxial state of stress at the center of sample 130, with the top center of sample 130 under the highest compression loads. The reason for the inner and middle pads is for loads to be evenly distributed across sample 105.

A heat load may be directed at sample 130 through the opening in upper fixture 105. Due to thermal expansion properties of most materials, this increases the magnitude of the compression stresses at the top center of the sample.

Although heating is applied to the tension side of sample 130, heat may also be applied to the other side of the opening of lower fixture 110.

Put simply, the embodiment shown in FIG. 1 provides the ability to apply heating load in an axisymmetric manner while also allowing the introduction of mechanical loads. For example, the heating load is applied in the center of sample 130. Although FIG. 1 shows a quarter of a circle, the center of the circular plate is exposed to the heating axisymmetrically (i.e., applying heat in 360 degrees). Introducing heat axisymmetrically causes the equiaxial stresses.

Figure 2:
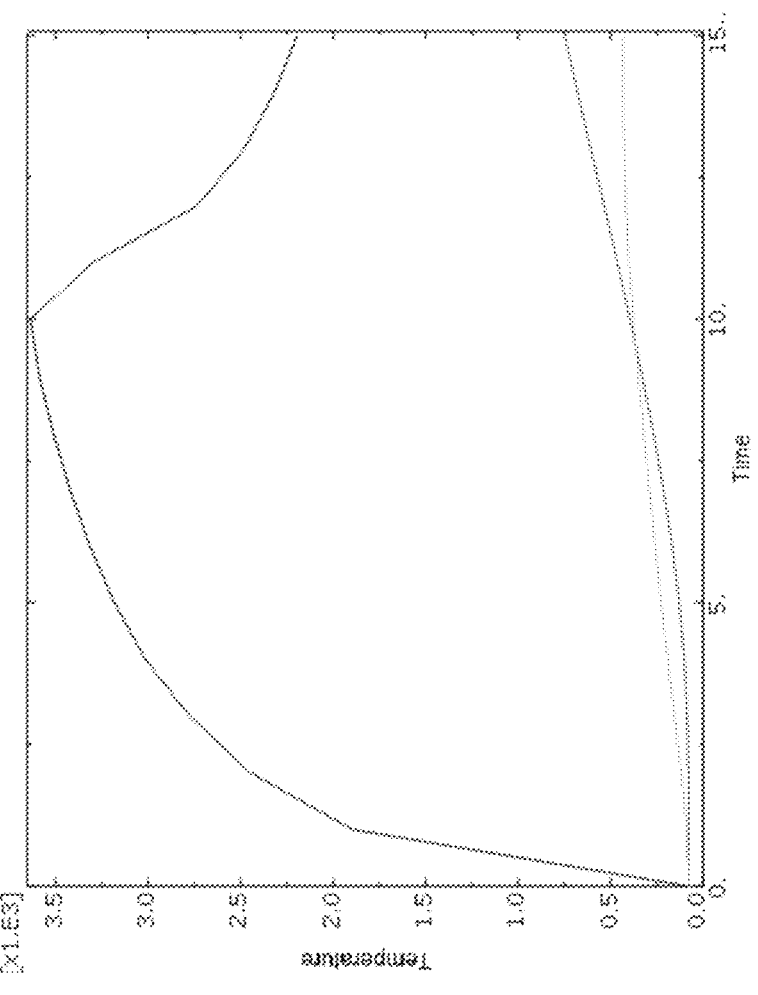
FIG. 2 is a graph illustrating the temperature predictions as a function of time from a heat transfer analysis, according to an embodiment of the present invention.

FIG. 2 is a graph 200 illustrating the temperature predictions as a function of time from a heat transfer analysis, according to an embodiment of the present invention. In graph 200, flight-like peak temperatures are reached at the center opening by applying the laser heating, where the failure is intended to occur. Temperatures are shown to reduce dramatically away from the heating area, which is preferred since the contact loads from the fixture is be applied to room temperature material (stronger), so failure is unlikely to occur there.

Figure 3:
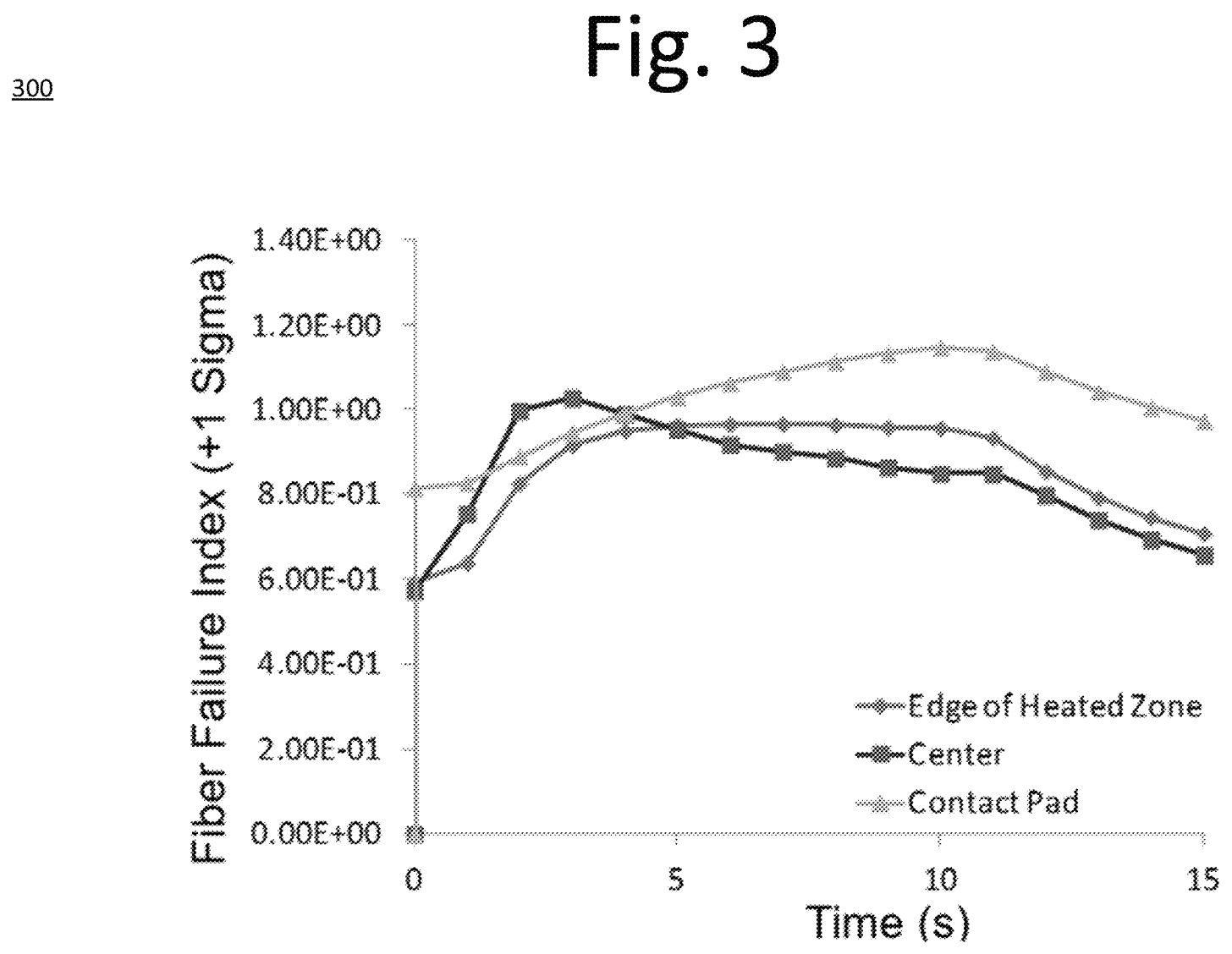

FIG. 3 is a graph 300 illustrating fiber failure index as a function of time, according to an embodiment of the present invention. In graph 300, fiber failure index is an indicator of when failure occurs, and a value of 1.0 is indicative that failure may be achieved. In graph 300, the failure mode that is to be induced, is at the centerplate of the sample, which is the desired failure mode. By applying mechanical loads and heating at the same time, an index measure of 1.0 may be achieved, which is indicative of failure.

An advantage of some of the embodiments is the configuration being proposed allows for axisymmetric loading that induces a state of compression stress around the circumference using an approach of introducing mechanical loads using bolts around the circumference of the fixture. In this embodiment, the method differs by allowing load introduction without the complexities involved of using an Instron machine and allows heat introduction through the opening on one side of the sample.

Figure 4:
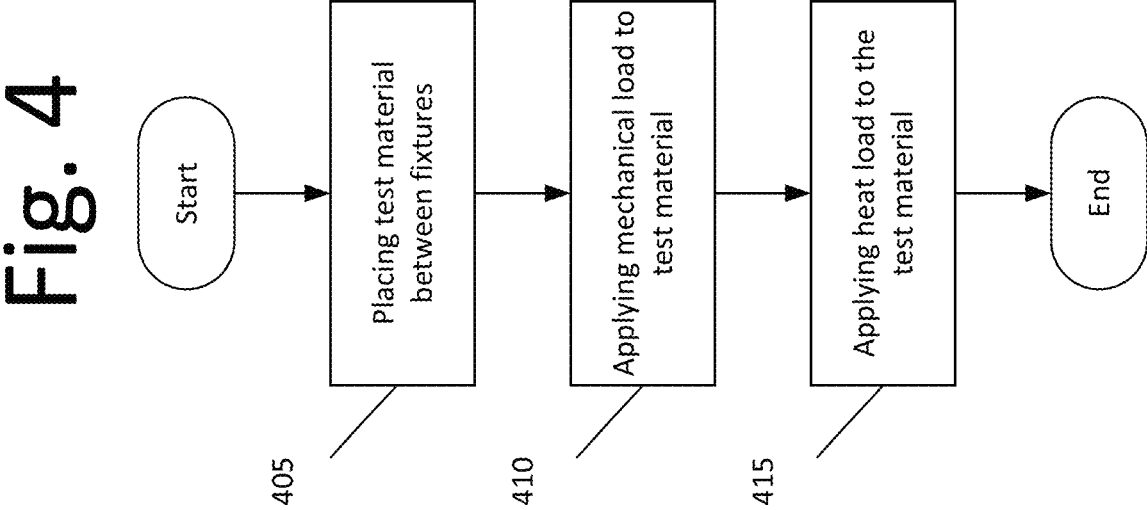
FIG. 4 is a flow diagram illustrating a method for evaluating structural capability of materials under axisymmetric thermomechanical loading, according to an embodiment of the present invention.

FIG. 4 is a flow diagram illustrating method 400 for evaluating structural capability of materials under axisymmetric thermomechanical loading, according to an embodiment of the present invention. In some embodiments, method 400 includes placing a test material between an upper fixture and a lower fixture at 405. At 410, method 400 includes applying a mechanical load around a circumference of the upper fixture and the lower fixture creating an equiaxial state of stress at center of the test material. The application of the preload may include tightening the bolts around the circumference of the upper fixture and the lower fixture. At 415, method 400 includes applying a heating load in an axisymmetric manner at center of the test material, causing equiaxial stresses.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus configured to evaluate structural capability of materials under axisymmetric thermomechanical loading, comprising:
   a test material placed between an upper fixture and a lower fixture; and
   a plurality of bolts arranged around the upper fixture and the lower fixture, wherein
   the plurality of bolts are configured to apply a preload around the circumference of the upper fixture and the lower fixture, and
   the upper fixture and the lower fixture comprises an opening facilitating a heat load to be applied to the test material.

2. The apparatus of claim 1, wherein the upper fixture and the lower fixture are composed of metallic material.

3. The apparatus of claim 1, wherein the lower fixture comprises an annulus with an inner radius that is a fraction in length of an outer radius of the upper fixture.

4. The apparatus of claim 1, wherein the upper fixture comprises an annulus with an outer radius equaling to that of bottom half of lower fixture.

5. The apparatus of claim 1, further comprising:

an outer pad proximate to the outer edge of the upper fixture and an outer edge of the bottom fixture configured to hold in place the test material.

6. The apparatus of claim 1, further comprising:

a middle pad and an inner pad extending downward from a top half of the upper fixture, such that the middle pad and the inner pad sit flat on the test material, and are configured to apply a mechanical load on the test material by way of tightening the plurality of bolts on an outer boundary of the upper fixture.

7. The apparatus of claim 1, wherein the plurality of bolts are configured to impose axisymmetric axial loads on the test material at a location of an outer pad, a middle pad, and an inner pad, creating an equiaxial state of stress at center of the test material, with a top center of the test material under the highest compression loads.

8. The apparatus of claim 1, wherein the plurality of bolts are configured to connect the upper fixture and the lower fixture together.

9. A method for evaluating structural capability of materials under axisymmetric thermomechanical loading, comprising:

placing a test material between an upper fixture and a lower fixture;

applying a mechanical load around a circumference of the upper fixture and the lower fixture creating an equiaxial state of stress at center of the test material, wherein the applying of the preload comprises tightening a plurality of bolts around the circumference of the upper fixture and the lower fixture; and applying a heating load in an axisymmetric manner at center of the test material, causing equiaxial stresses.

10. The method of claim 9, wherein the applying the heat load comprises introducing heat to the center of the test material by way of a hole in the upper fixture and the hole in the lower fixture.

11. The method of claim 9, further comprising:

placing the test material on an outer pad proximate to an outer edge of the upper fixture and an outer edge of the bottom fixture.

12. The method of claim 9, further comprising:

placing a middle pad and an inner pad extending downward from a top half of the upper fixture on the test material, such that the middle pad and the inner pad sit flat on the test material.

13. The method of claim 12, further comprising:

applying, by the middle pad and inner pad, a mechanical load on the test material by way of tightening the plurality of bolts on an outer boundary of the upper fixture.

14. The method of claim 9, further comprising:

connecting the upper fixture and the lower fixture by tightening of the plurality of bolts.

15. The method of claim 9, wherein the mechanical load and the heat load are applied simultaneously.

16. An apparatus configured to evaluate structural capability of materials under axisymmetric thermomechanical loading, comprising:

a test material placed between an upper fixture and a lower fixture; and a plurality of bolts arranged around the upper fixture and the lower fixture, wherein the plurality of bolts are configured to apply a mechanical load around the circumference of the upper fixture and the lower fixture, the upper fixture and the lower fixture comprises an opening facilitating a heat load to be applied to the test material, and the mechanical load and the heat load are applied simultaneously.

17. The apparatus of claim 16, further comprising:

an outer pad proximate to the outer edge of the upper fixture and an outer edge of the bottom fixture configured to hold in place the test material.

18. The apparatus of claim 16, further comprising:

a middle pad and an inner pad extending downward from a top half of the upper fixture, such that the middle pad and the inner pad sit flat on the test material, and are configured to apply a mechanical load on the test material by way of tightening the plurality of bolts on an outer boundary of the upper fixture.

19. The apparatus of claim 16, wherein the plurality of bolts are configured to impose axisymmetric axial loads on the test material at a location of an outer pad, a middle pad, and an inner pad, creating an equiaxial state of stress at center of the test material, with a top center of the test material under the highest compression loads.

20. The apparatus of claim 16, wherein the plurality of bolts are configured to connect the upper fixture and the lower fixture together.

* * * * *